(No Model.) 2 Sheets—Sheet 2.

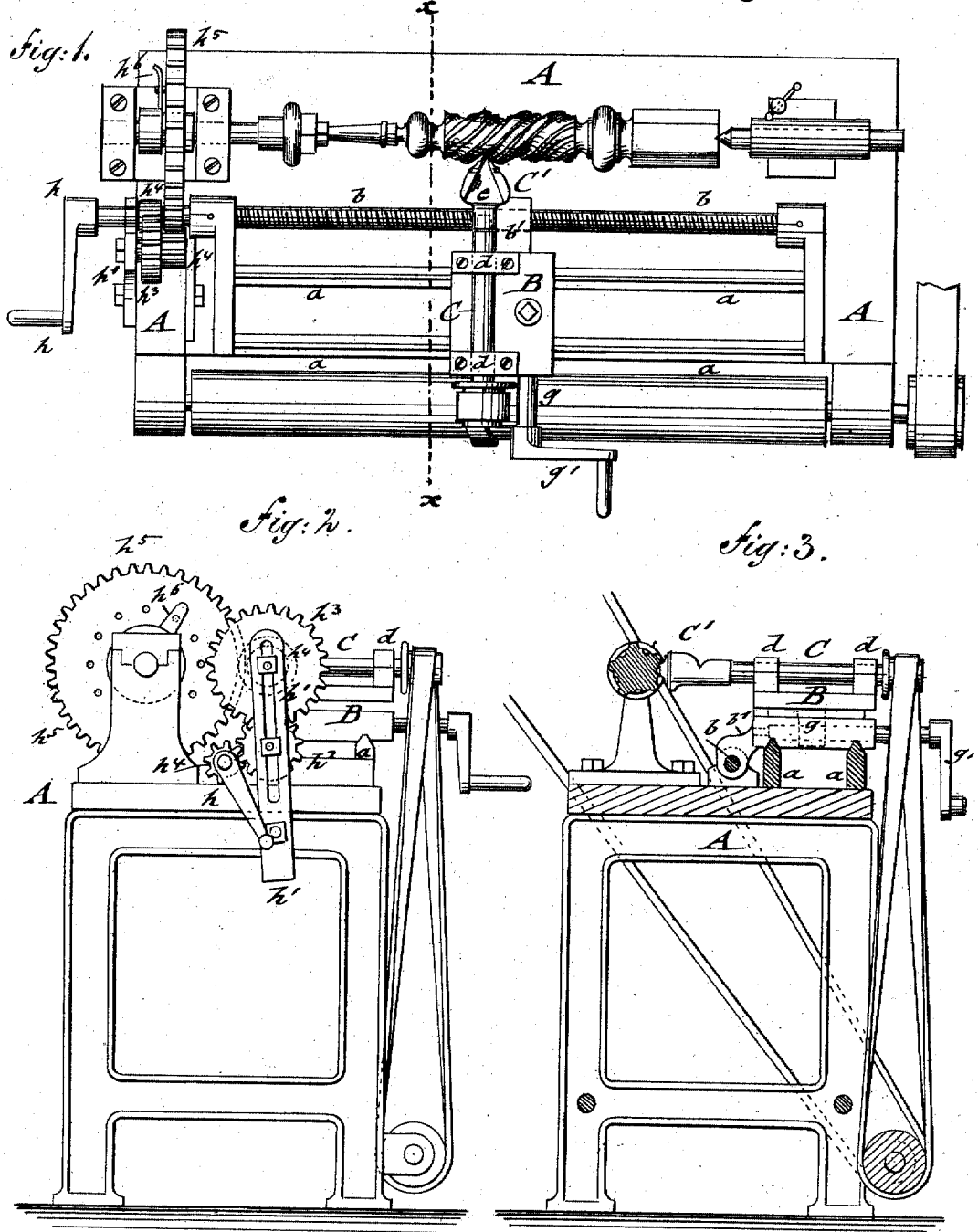

V. MERKLEN.
LATHE FOR TURNING SPIRALS.

No. 245,740. Patented Aug. 16, 1881.

WITNESSES:
Carl Karp
Otto Risch

INVENTOR:
Valentin Merklen
BY Paul Goepel
ATTORNEY.

UNITED STATES PATENT OFFICE.

VALENTIN MERKLEN, OF NEW YORK, N. Y.

LATHE FOR TURNING SPIRALS.

SPECIFICATION forming part of Letters Patent No. 245,740, dated August 16, 1881.

Application filed May 19, 1881. (No model.)

*To all whom it may concern:*

Be it known that I, VALENTIN MERKLEN, of the city, county, and State of New York, have invented certain new and useful Improvements in Carving Attachments to Lathes, of which the following is a specification.

This invention refers to an improvement in lathes, by which balusters, chair and table legs, and other articles may be ornamented with spiral flutings of plain or profiled cross-sections, or with pearls, beads, or other ornamentation, in a quicker, less expensive, and more uniform manner than by hand-operated tools heretofore employed.

In carrying out my invention I use a rotary cutter-head which is preferably recessed and carries at a suitable angle of inclination an interchangeable cutter-knife secured adjustably to one of the inclined cheeks of the cutter-head. The cutter-head is secured to a revolving shaft, which is placed at right angles to the axis of the work and supported in bearings of a traversing carriage. The traversing carriage is operated by a longitudinal revolving screw, while the cutter-shaft receives simultaneously rotary motion from a cylindrical pulley, which extends along the entire lower part of the lathe. This carriage is divided horizontally, the upper part, which carries the cutter-shaft, being adjustable transversely of the lathe by means of a screw on ways of the lower part, whereby the cutter-head is adjusted toward or from the work. The cutter-head is provided with a profiled cap, which is recessed so as to correspond to the recess of the cutter-head, and secured to the face of the cutter-head by a concentric guide-shoulder and eccentrically-arranged fastening screw-bolt.

Figure 1:
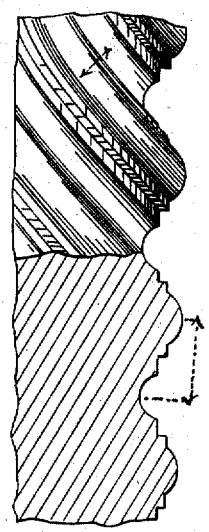
Figure 4:
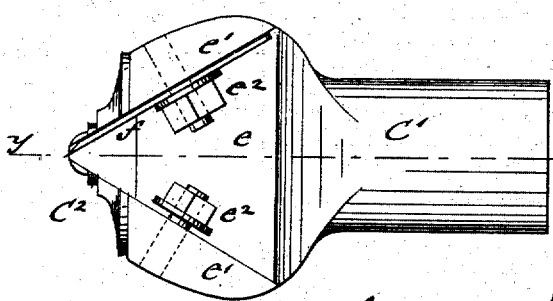
Figure 6:
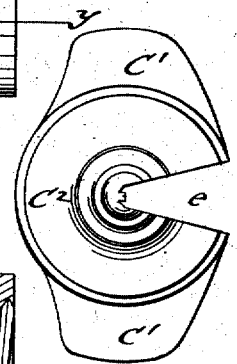
Figure 5:
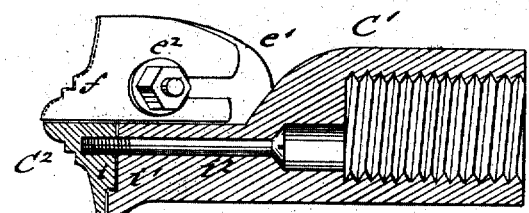
Figure 9:
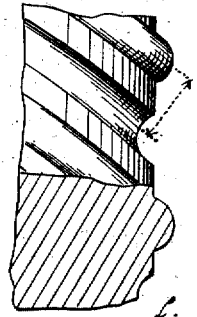
Figure 8:
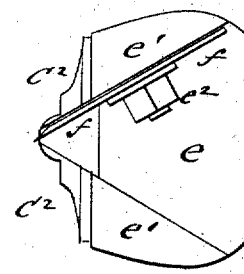
Figure 11:
Figure 10:
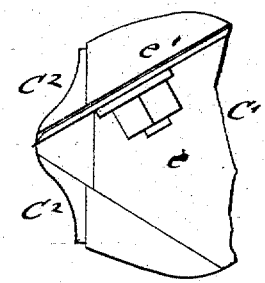
Figure 13:
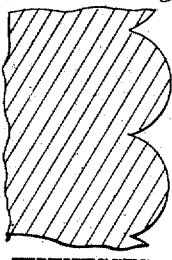
Figure 12:
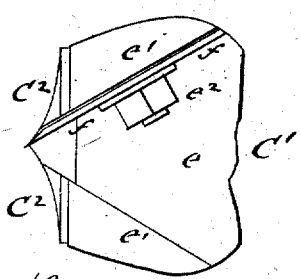

In the accompanying drawings, Figure 1 represents a plan view of a lathe with my improved carving attachment. Fig. 2 is an end view of the same; Fig. 3, a vertical transverse section on line $x\ x$, Fig. 1. Figs. 4, 5, and 6 are respectively a side view, a vertical central section on line $y\ y$, Fig. 4, and an end view of the cutter-head. Fig. 7 shows a pattern cut by the cutter-head represented in Figs. 4 to 6, and Figs. 8 to 16 represent different cutter-heads and profiles of the work accomplished by the same.

Similar letters of reference indicate corresponding parts.

Referring to the drawings, A represents a common lathe, the lathe-centers of which support the baluster, table or chair leg, or other article to be carved.

On longitudinal rails $a$ of the lathe is supported a carriage, B, to which traversing motion is imparted by a longitudinal revolving screw, $b$, which engages a threaded side socket, $b'$, of the carriage B. The traversing carriage B supports in bearings $d$ a shaft, C, the axis of which is arranged at right angles to the axis of the work supported in the lathe-centers. The shaft C carries the cutter-head C', which has a triangular side recess, $e$, so as to form inclined cheeks $e'$, to either one of which the cutting-knife $f$ is tightly clamped by means of fastening-screws $e^2$, according as a right or left hand screw profile is to be produced. The cutter-shaft C receives rotary motion by means of a pulley which extends at the lower part of the lathe along the full length of the same, and is revolved by a belt-and-pulley connection with a counter-shaft above.

The upper part of the carriage B is guided in transverse rails of the lower part and moved thereon toward or away from the work by a screw, $g$, turned by a hand-crank, $g'$, said screw engaging a nut of the upper part of the carriage B, as shown in Fig. 3. The cutter-head C' is thereby set to the blank mounted in the lathe-centers or away from the same, as required.

The relative position of the carriage B and cutter-head C' is changed in longitudinal direction on the lathe by turning the screw-shaft $b$ by a hand-crank, $h$, until the cutter-head assumes its proper position toward the work. A slotted standard, $h'$, is clamped to one end of the lathe-frame and provided with interchangeable gear-wheels $h^2\ h^3$, of which the lower gear meshes with a pinion, $h^4$, of the screw-shaft $b$, while the gear-wheel $h^3$ meshes by a pinion fixed thereto with a gear-wheel, $h^5$, of one of the lathe-spindles. By throwing the slotted standard $h'$ toward the screw-shaft until the gear-wheels intermesh and turning the hand-crank $h$ motion is transmitted from the screw-shaft to the lathe-spindles and the blank to be carved, which is thereby slowly revolved, while it is at the same acted upon by the revolving cutter-head C'. By applying differently-sized gear-wheels to the slotted standard $h'$ a quicker or slower motion is imparted to the blank, according to the pitch required.

In place of working the screw-shaft by hand, it can also be worked by power by means of pulleys and belt and a suitable belt-shifting device.

The blank is adjusted axially in the lathe-centers in the usual manner by locking the gear-wheel $h^5$ consecutively into different axial positions by a spring-pin, $h^6$, which enters equidistant socket-holes of the gear-wheel.

The construction of the cutter-head C' and the shape of the cutting-knives are clearly shown in detail in Figs. 4, 5, 6, 8, 10, 12, 14, and 15. The cutter-head C' is screwed by its interiorly-threaded shank tightly upon the end of the cutter-shaft, and the cutting-knife clamped into position to one of the cheeks of the cutter-head. The profile of the cutting-knife is equal to the profile of one-half of the section of the pattern to be produced upon the work, so that by the rotations of the cutting-knife the full pattern is produced. The inner edge of the cutting-knife is exactly in line with the center of the cutter-head, which is faced by a detachable cap, $C^2$, having the same profile as the cutting-knife. The cap $C^2$ is recessed in line with the inclined cheeks of the cutter-head to admit the setting of the knife so as to project somewhat beyond the cap $C^2$. The cap $C^2$ is placed accurately in position upon the cutter-head by means of a concentric shoulder, $i$, which fits into a concentric recess, $i'$, of the cutter-head, as shown clearly in Fig. 5. The cap $C^2$ is secured by an eccentrically-arranged screw-bolt, $i^2$, which passes longitudinally through the cutter-head, and which can be removed by unscrewing, so as to release the face-cap after the cutter-head is removed from its shaft.

The cutter-head C' can be employed for cutting a right or left hand spiral, according as the cutting-knife is secured to one cheek or the other of the cutter-head.

Figure 15:
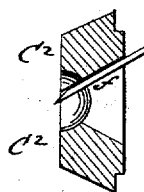
Figure 14:
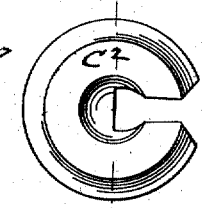
Figure 16:
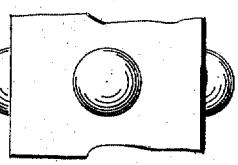

When the revolving cutter-head is applied to the work, it produces, by the inclined position of the knife to the work, the simultaneous traversing motion of the cutter-shaft, and the slow turning motion of the blank, a spiral ornamental profile upon the baluster or other article to be carved. When one entire spiral is thus carved upon the baluster the carving attachment is returned to its starting position, the baluster turned on its axis for the required distance, and a second spiral cut in the same manner, and so on until the spiral ornamentation of the baluster or other article is completed. In this manner simple or compound profiles, channels, flutings, &c., may be carved spirally upon the article to be ornamented, also pearls, as shown in Figs. 14, 15, and 16, which latter may be arranged in circular or spiral lines, as desired.

The carving attachment facilitates the production of spiral ornamentation, as it is accomplished by power and dispenses with the tedious and expensive carving of this class of ornamentation by hand.

Having thus described my invention, I claim as new and desire to secure by Letters Patent—

In a lathe, the combination of a longitudinally-traversing carriage divided horizontally, the upper part being adjustable transversely of the lathe on ways of the lower part by means of a screw, a longitudinal screw-shaft for operating the carriage, a cutter-head mounted on said carriage at right angles to the axis of the work, a rotary cutter-head attached to the cutter-shaft, and mechanism for rotating the work simultaneously with the movement of the carriage and cutter-head, substantially as described.

In testimony that I claim the foregoing as my invention I have signed my name, in presence of two witnesses, this 7th day of March, 1881.

VALENTIN MERKLEN.

Witnesses:
PAUL GOEPEL,
CARL KARP.

It is hereby certified that in Letters Patent No. 245,740, granted August 16, 1881, upon the application of Valentin Merklen, of New York, New York, for an improvement in "Lathes for Turning Spirals," an error appears in the printed specification requiring correction, as follows: In line 80, page 2, the word "cutter-head" should read *cutter-shaft*; and that the Letters Patent should be read with this correction therein that the same may conform to the record of the case in the Patent Office.

Signed, countersigned, and sealed this 22d day of June, A. D. 1886.

[SEAL.]

D. L. HAWKINS,
*Acting Secretary of the Interior.*

Countersigned:

M. V. MONTGOMERY,
*Commissioner of Patents.*